Oct. 29, 1963    H. O. MOORE    3,108,286
VALVE MECHANISM FOR FLUSH TANKS
Filed Oct. 31, 1962    5 Sheets-Sheet 1

INVENTOR.
HARRY O. MOORE
BY
Eaton, Bell, Hunt & Bultzer
ATTORNEYS

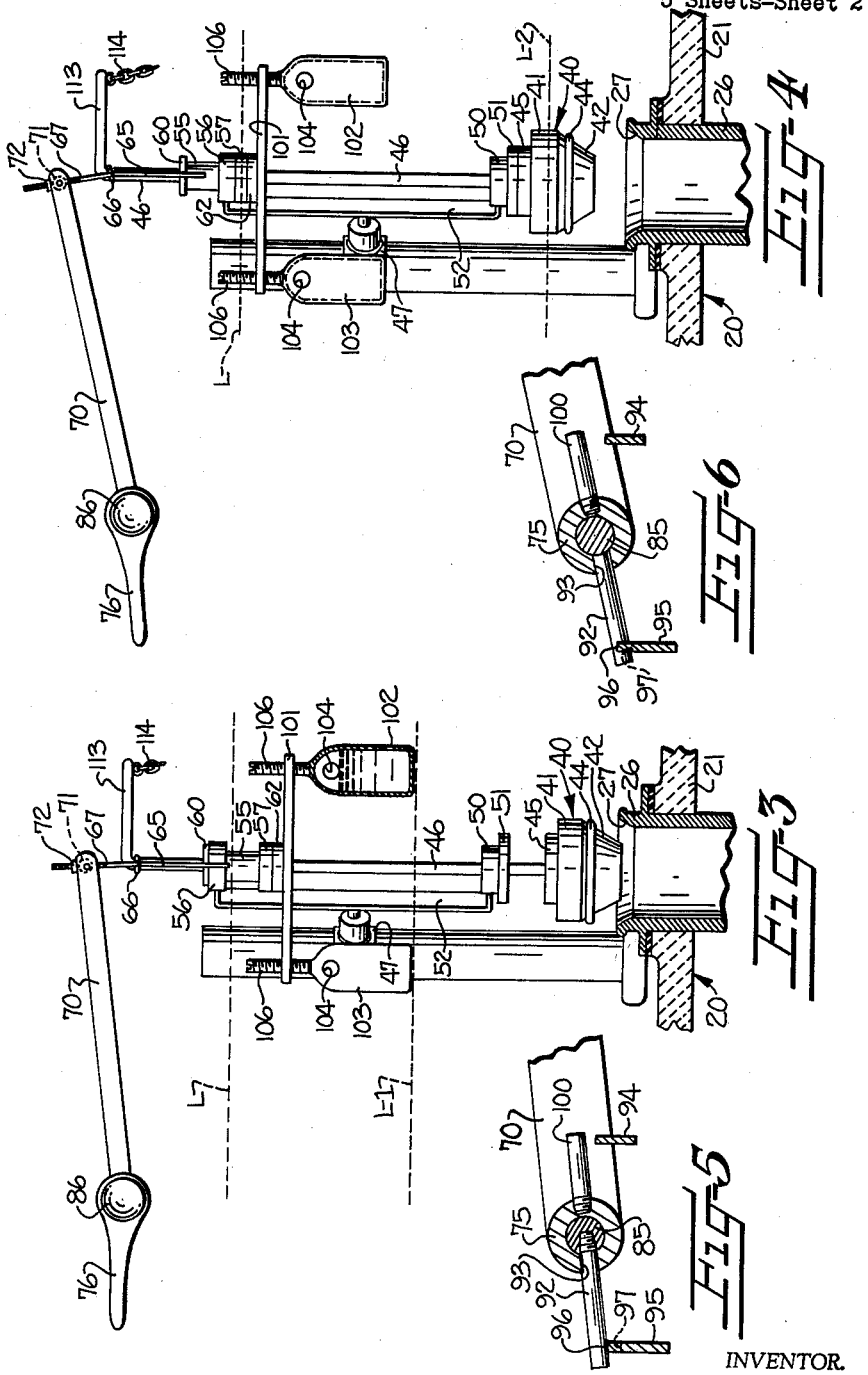

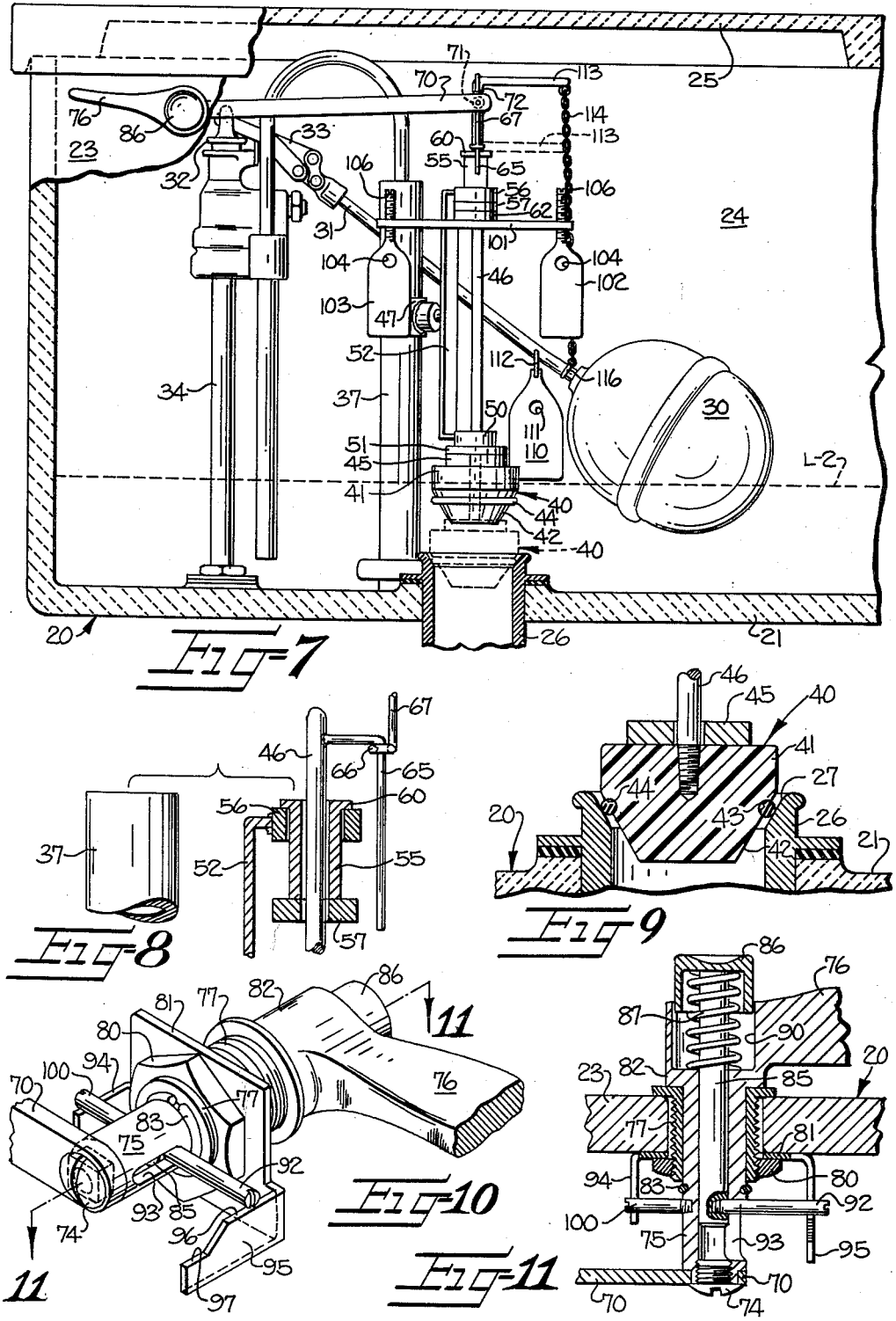

INVENTOR.
HARRY O. MOORE

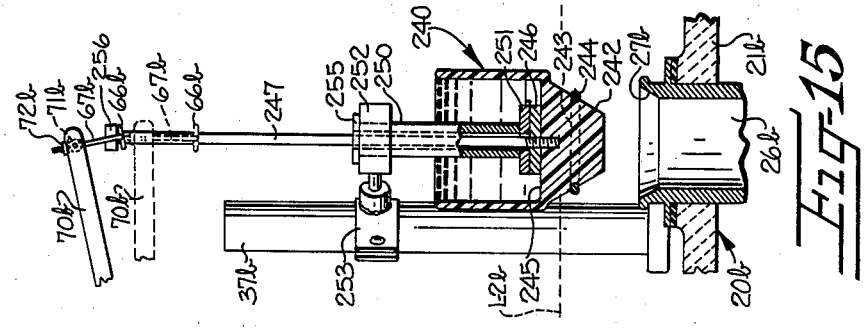
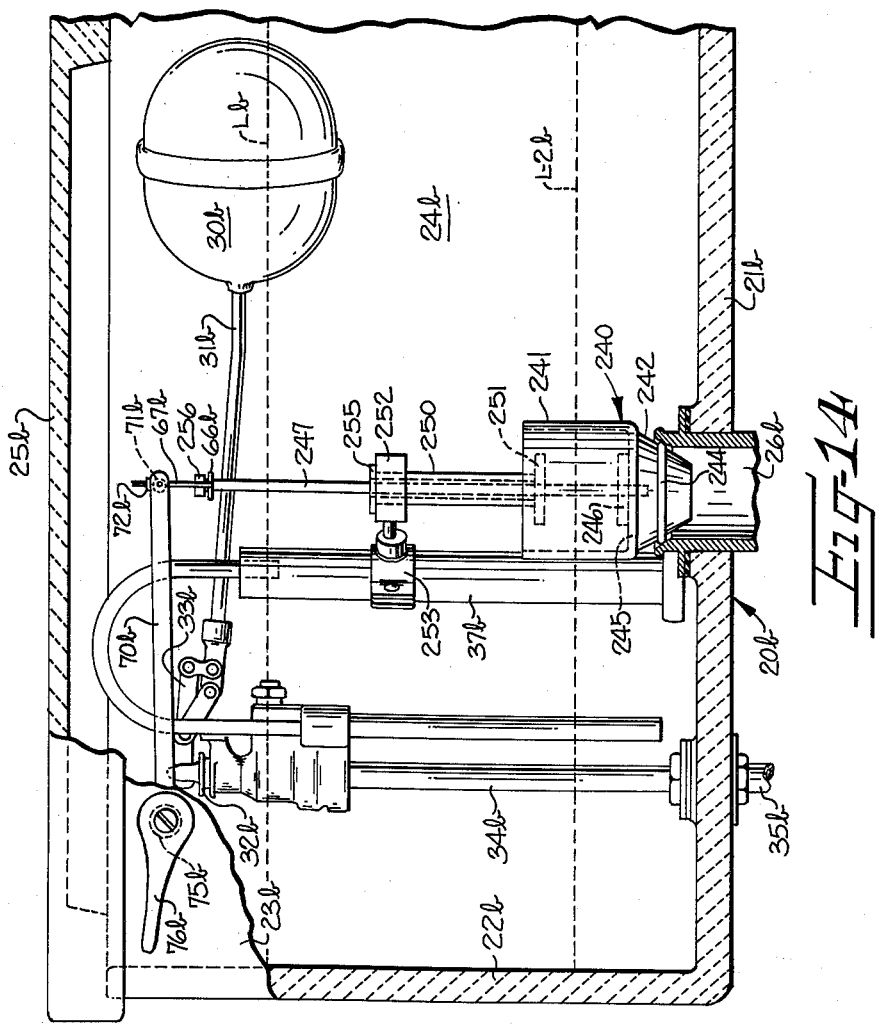

United States Patent Office 3,108,286
Patented Oct. 29, 1963

3,108,286
VALVE MECHANISM FOR FLUSH TANKS
Harry O. Moore, 2921 Rozzells Ferry Road, Charlotte, N.C., assignor of fifty percent to Frank E. Godley, Charlotte, N.C.
Filed Oct. 31, 1962, Ser. No. 234,301
20 Claims. (Cl. 4—55)

This invention relates to valve mechanisms for flush tanks, such as those used for toilets, and it is an object of this invention to provide an improved magnetic means for supporting a flush tank valve member when it is raised to open position, with means for automatically releasing the valve member and permitting the same to drop to closed position upon the upper surface of the water in the tank being lowered to a predetermined level as water escapes through the tank outlet.

It is another object of this invention to provide a valve mechanism of the type described, in which the valve member may be heavier than the water displaced thereby, and wherein at least one suspension member spaced above the normally closed valve member has at least one first metallic plate thereon which is engaged by a second metallic plate movable with the valve member when the valve member is raised to open position a predetermined distance above the tank outlet, and wherein at least one of the metallic plates is in the form of a permanent magnet for supporting the valve member in a raised position. Means are also provided for automatically releasing the second plate from the first plate to return the valve member to closed position upon lowering of the level of the water in the tank to a given distance below its normal filled level.

It is still another object of this invention to provide mechanism of the character described including manually controlled means for selectively raising the valve member to either of two different positions, with magnetic means selectively supporting the valve member in said two positions and means for automatically releasing the valve member from the respective magnetic means when the upper surface of the water is lowered to either of two predetermined levels, depending upon the position to which the valve member was raised, whereby either a large or relatively small amount of water may be automatically discharged from the tank at the will of the operator.

Some of the objects of the invention having been stated, other objects will appear as the description proceeds, when taken in connection with the accompanying drawings, in which—

FIGURE 3 is a fragmentary view similar to the central portion of FIGURE 2 showing the valve member in partially raised or intermediate open position to which it is raised for discharging a relatively small amount of water from the flush tank;

FIGURE 4 is a view similar to FIGURE 3 showing the valve member occupying a fully raised position to which it is raised for the purpose of discharging a relatively large amount or all of the water from the flush tank;

FIGURE 5 is a fragmentary vertical sectional view taken substantially along line 5—5 in FIGURE 1 and showing the position occupied by the manually controlled operating lever when the valve member is raised to the intermediate position shown in FIGURE 3;

FIGURE 6 is a view similar to FIGURE 5 showing the position occupied by the operating lever when the valve member occupies the fully raised position shown in FIGURE 4;

FIGURE 7 is a view similar to FIGURE 2, showing the valve member in the same position as that shown in FIGURE 4, and showing the float in the position occupied thereby immediately preceding the movement of the valve member to the closed position of FIGURE 2;

FIGURE 8 is an enlarged fragmentary view of the structure shown in the upper central portion of FIGURE 2, but being taken substantially along line 8—8 in FIGURE 1;

FIGURE 9 is an enlarged transverse vertical sectional view through the valve member and the valve seat in the outlet of the flush tank and being taken substantially along a line corresponding to the line along which FIGURE 8 is taken in FIGURE 1;

FIGURE 10 is an enlarged perspective view of the manual control device taken looking at the inside thereof in the general direction of the arrow indicated at 10 in FIGURE 1;

FIGURE 11 is a fragmentary sectional plan view taken substantially along line 11—11 in FIGURE 10;

Figure 1:
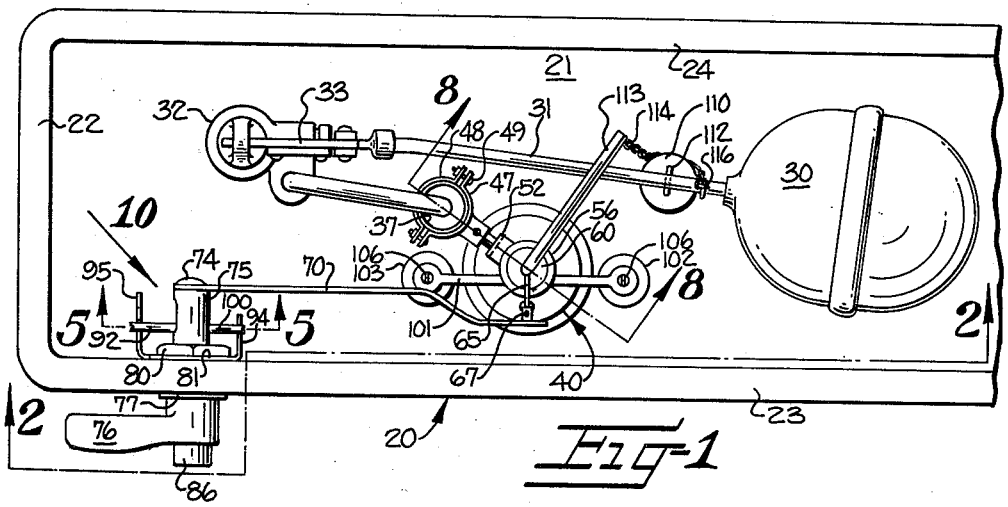
FIGURE 1 is a top plan view of a conventional flush tank with the cover removed and showing a first form of the improved valve mechanism in association therewith, and wherein the valve mechanism is operated through the medium of a manually controlled operating lever.
Figure 2:
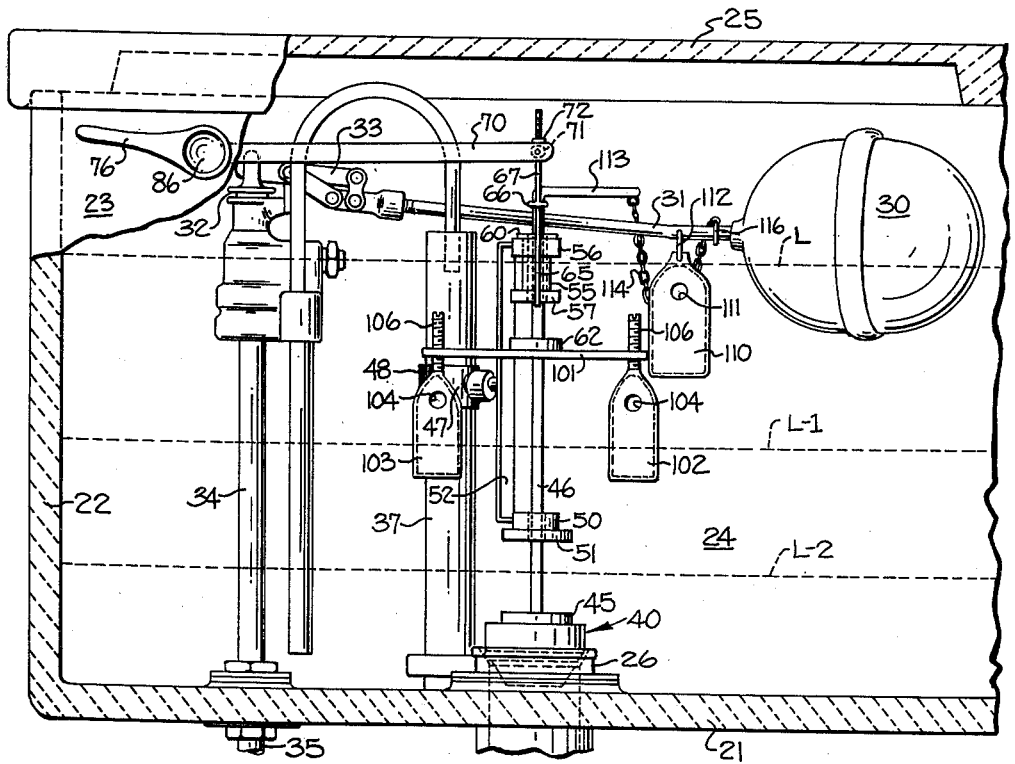
FIGURE 2 is an elevation, partially in section, taken substantially along line 2—2 in FIGURE 1 and showing one form of the discharge valve member in closed position.

FIGURE 14 is a view similar to FIGURE 2 showing a third form of the invention wherein the discharge valve member serves as its own weight-increasing means when the water is being discharged and recedes to a point adjacent the bottom thereof, particularly in a full flushing operation, thus obviating the need for separate weight means being suspended from the float stem, such as that shown in FIGURES 1, 2, 7 and 12;

FIGURE 15 is a somewhat schematic view of the parts shown in the central portion of FIGURE 14, showing the discharge valve member in cross-section and in open position.

Brief Synopsis of the Invention

In two embodiments of the invention, a normally closed discharge valve member is fixed to the lower end of a substantially vertical shaft having a permanent magnet fixed on a medial portion thereof. The valve member may also have a permanent magnet thereon. When the valve member is raised to an intermediate position the magnet on the shaft contacts and is supported by a suspension permanent magnet on the lower end of a suspended vertically movable sleeve. When the valve member is raised to its uppermost position, the sleeve is raised with the valve member and the magnet on the valve member is moved into engagement with a fixed lower permanent magnet spaced beneath the magnet fixed on said shaft.

The field strength of the fixed lower magnet and the magnet on the valve member is substantially greater than the field strength of the magnets on the shaft and the sleeve so that, upon the surface of the water being lowered to an intermediate level a predetermined relatively light weight is applied to the valve member and, if the valve member is then supported only by the magnets on the shaft and the sleeve, this additional light weight separates the magnets, and the valve member thus released drops to closed position. On the other hand, if the valve member is raised sufficiently so that its magnet engages the fixed lower magnet, a relatively heavy additional weight is applied to the valve member, only upon substantially all the water being discharged from the flush tank, and this relatively heavy weight is such as to separate the magnet on the valve member from the fixed magnet and permit the valve member to drop to closed position after the tank has been substantially emptied.

In the third embodiment of the invention, the normally closed discharge valve member is in the form of a cup-shaped body having a permanent magnet fixed on the upper surface of the bottom thereof, and the suspension permanent magnet is spaced above the magnet in the body of the valve member so that, when the valve member is raised to open the same and move the magnet in the body against the suspension magnet, the magnets support only the weight of the valve member as long as the valve member is submerged in the water in the tank. However, when the level of the water in the tank recedes to a point adjacent the bottom of the valve member, the water contained in the exposed cup-shaped body increases the effective weight of the valve member sufficiently to overcome the magnetic attraction between the magnets so the valve member will then drop to closed position.

*First Embodiment of the Invention*

Referring more specifically to the drawings, the first embodiment of the invention is shown in FIGURES 1 to 11, inclusive, in association with a conventional flush tank broadly designated at 20 (FIGURES 1, 2, 3, 4, 7, 9 and 11). Flush tank 20 may be of the type used for toilets and comprises a bottom wall 21, opposed, spaced, upright end walls 22, and spaced front and rear walls 23, 24 over which a conventional removable cover 25 is positioned. The bottom wall 21 of tank 20 has the usual outlet therein which is defined by a discharge or water outlet pipe 26 having a valve seat 27 in its upper end which is adapted to be engaged by the improved valve member to be later described.

Tank 20 contains a conventional float 30 which is connected by a stem or radius arm 31 to a water inlet valve 32 through the medium of links 33. As is usual, water inlet valve 32 is positioned on the upper end of an inlet pipe 34 which protrudes above the filled normal level L of the water in the tank 20 and whose lower end is suitably attached to the bottom wall 21 and communicates with a water inlet pipe 35 extending from a suitable source of water, not shown. As is well-known, inlet valve 32 is held closed when float 30 is supported in fully raised position by the water in tank 20, but gradually opens as the water level recedes and gradually closes as the water level rises. Spaced inwardly from the water inlet pipe 34 is a standard 37 which, in this instance, is embodied in a conventional overflow pipe which is used as a convenient means of supporting certain elements of the invention, as will be presently described.

The valve mechanism of the first form of the invention shown in FIGURES 1 through 11 includes an improved valve member 40 comprising a substantially cylindrical body 41 having a substantially frusto-conical or tapered lower portion 42 (FIGURE 9) which is provided with a peripheral groove 43 therein for receiving a resilient sealing element or O-ring 44 therein. Body 41 and its frusto-conical lower portion 42 may be made from plastic or any other suitable material and is preferably of greater weight or specific gravity than the water displaced thereby. The tapered lower portion 42 of valve member 40 is adapted to fit loosely within the upper end of outlet pipe 26 with its O-ring 44 in engagement with the tapered valve seat 27 for normally closing the outlet of tank 20.

At least the upper portion of valve member 40 is in the form of a metallic plate or disk 45 which may be adhesively or otherwise suitably secured to the upper surface of body 41. Plate 45 is preferably a permanent magnet. The body 41 of valve member 40 has the lower end of a rod or shaft 46 suitably connected thereto, as by being threaded thereinto. Rod 46 is preferably made from copper or other non-magnetic material and is guided for vertical sliding movement in a lower fixed guide member which, with a metallic plate 51 attached to the lower surface thereof, forms a suspension member for the valve member 40 when it is raised sufficiently to where its metallic plate 45 engages metallic plate 51.

Metallic plate 51 is also preferably in the form of a permanent magnet. In other words, either or both of the metallic plates 45, 51 must be in the form of a permanent magnet having sufficient field strength to substantially support the weight of valve member 40 and its metallic plate 45, along with any other elements carried thereby, when the valve member 40 is raised to its uppermost position as shown in FIGURE 4 and metallic plate 45 is in engagement with metallic plate 51. Accordingly both plates 45, 51 will be referred to hereinafter as permanent magnets.

Guide member 50 is suitably secured to the lower end of a bracket 52 which extends upwardly, and a medial portion of which is attached to standard 37, as by means of a pair of substantially semi-circular clamp members 47, 48 (FIGURE 1) which are suitably interconnected by bolts 49. Clamp member 47 may be suitably secured to or formed integral with bracket 52.

Rod 46 is also loosely guided for vertical movement within a vertically shiftable suspension sleeve 55 which is spaced a substantial distance above fixed guide member 50 and is, in turn, guided for vertical sliding movement and an upper fixed guide member 56 suitably secured to the upper end of bracket 52. Sleeve 55 has a metallic plate 57 suitably connected to the lower end thereof which is also loosely penetrated by rod 46. Sleeve 55 and metallic plate 57 collectively form an upper suspension member and the metallic plate 57 is also preferably in the form of a permanent magnet. Accordingly, sleeve 55, guide member 56 and bracket 52 should be made from copper or other non-magnetic material. In order to limit downward movement of sleeve 55, the upper end thereof is provided with an annular flange 60 which normally rests upon the upper guide member 56.

A medial portion of rod 46, spaced substantially above magnet 51, has a metallic plate 62 suitably secured thereto, this metallic plate 62 also preferably being in the form of a permanent magnet. In other words, either or both of the metallic plates 57, 62 must be in the form of a permanent magnet. In either event, the metallic plate 62, when in engagement with metallic plate 57 should be attracted thereto by a magnetic force less than at which the metallic plates 45, 51 are attracted to each other when the metallic plates 45, 51 are in engagement with each other. However, the magnetic force attracting the metallic plates 57, 62 to each other must be sufficient to support somewhat more than the weight of the metallic plates 62 and 45, the rod 46 and the valve member 40 so that, when valve member 40 is raised from the closed position of FIGURE 2 to the intermediate raised position of FIGURE 3, the magnetic attraction between metallic plates 57, 62 will maintain the valve member 40 in raised position at least while the water in the tank is between the normal level L and an intermediate level L-1. Since either or both plates 57, 62 may be a permanent magnet, both of them will be termed as such hereinafter.

It should be noted that the positions of the magnets 45, 62 relative to the respective magnets 51, 57 is such that, upon the valve member 40 being raised to an intermediate open position as shown in FIGURE 3, magnet 62 will be moved into engagement with magnet 57 while magnets 45, 51 remain in substantially spaced relationship. Of course, at this time, sleeve 55 occupies its lowermost position relative to the upper fixed guide member 56.

On the other hand, when the valve member 40 occupies the intermediate raised position of FIGURE 3, the distance between magnets 45, 51 should be substantially the same as, or less than, the distance between the proximal surfaces of upper fixed guide 56 and magnet 57 to insure that magnet 45 may be raised into sufficiently close proximity to, or into engagement with, magnet 51 so that valve member 40 may be supported by the lower suspension member 50, 51 when it is lifted to its fully raised position as shown in FIGURE 4.

When valve member 40 is raised to intermediate position, a predetermined small amount of water is permitted to pass through outlet pipe 26 before valve member 40 returns to closed position, as will be later explained. Therefore, said intermediate position may also be termed as a primary flushing position. However, when valve member 40 is raised to uppermost position, nearly all the water is discharged from tank 20 before valve member 40 returns to closed position. Thus, the fully raised or uppermost position of valve member 40 may be termed as a secondary flushing position. Two types of manually controlled means are disclosed herein for selectively raising the valve member 40 from its normally closed position shown in FIGURE 2 to the intermediate or primary flushing position of FIGURE 3 or the fully raised or secondary flushing position of FIGURE 4.

The first form of manually controlled valve raising means is embodied in a manually operable lever mechanism, and the second form of discharge valve raising means is embodied in a manually operable electrical mechanism to be later described. The first embodiment of the discharge valve raising means is shown in FIGURES 1 through 11, and now will be described in detail.

As best shown in FIGURE 8, it will be observed that the upper end portion of the rod 46 to which discharge valve member 40 is connected has an inverted substantially L-shaped lift guide 65 welded or otherwise suitably secured thereto and whose vertical portion is positioned outwardly of upper fixed guide 56, sleeve 55 and magnet 57 so that the vertical portion or leg of lift guide 65 may extend downwardly past the upper fixed guide 56 and magnet 57 when the valve member 40 occupies closed position. The substantially vertical leg of lift guide 65 loosely extends through the looped lower end 66 of a connecting rod 67.

Connecting rod 67 extends upwardly and is pivotally and adjustably connected to the free end of an operating lever 70. To this end, the free end of lever 70 has a cuff member 71 journaled thereon which is loosely penetrated by connecting rod 67. The upper end of connecting rod 67 has a nut 72 threaded thereon which normally rests against the upper surface of cuff member 71 and serves to suspend the connecting rod 67 from cuff member 71 and lever 70.

Operating lever 70 extends outwardly to a point spaced inwardly of, but disposed adjacent, the side wall 22 of tank 20 and is suitably secured, as by a screw 74, to the inner end of a control shaft or shank 75 of an operating handle 76. As best shown in FIGURE 11, control shaft 75 is journaled in and projects through front wall 23 of tank 20, adjacent the upper portion thereof (FIGURE 2). In this instance, it will be observed in FIGURES 10 and 11 that control shaft 75 is rotatably mounted in a flanged, externally threaded, bushing 77 whose flanged outer end bears against the outer surface of front wall 23 of tank 20, and whose threaded portion loosely extends through wall 23.

The inner end of bushing 77 has a nut 80 threaded thereon for securing bushing 77 in wall 23. Nut 80 also serves to secure a cam bracket 81 against the inner surface of front wall 23 of tank 20. The outer end of shaft 75 has an enlarged portion 82 integral therewith, from which handle 76 extends, and which bears against the flanged outer end of bushing 77. Endwise movement of shaft 75 is further limited by a suitable snap-ring 83 which fits in a suitable groove encircling shaft 75 adjacent the inner end of bushing 77.

Referring to FIGURES 5, 6 and 11, it will be observed that shaft 75 is of hollow or tubular construction and has a follower shaft 85 mounted for longitudinal sliding movement therein. The outer end of follower shaft 85 has a cup-shaped push-button 86 fixed thereon against which one end of a compression spring 87 is positioned. The other end of compression spring 87 bears against the bottom of a cavity or counterbore 90 formed in the outer end of shank 75 and within which the push-button 86 may have free sliding movement.

When push-button 86 occupies its normally extended or relaxed position shown in FIGURES 10 and 11, the end of follower shaft 85 remote from push-button 86 is spaced substantially from the corresponding end of the threaded body of screw 74. Outward movement of push-button 86 and follower shaft 85 is limited by engagement of an elongate follower or rod 92 with one end of a longitudinally extending slot 93 formed in one side of shank 75. Follower 92 is suitably secured to and extends radially from follower shaft 85.

As best shown in FIGURES 5, 6 and 10, opposed sides of cam bracket 81 have inwardly projecting ears 94, 95 thereon. Ear 95 serves as a cam and has a high cam surface or stop 96 and a low cam surface 97 or stop forming the upper edge thereof. When push-button 86 is in the normal, extended or relaxed position of FIGURES 10 and 11, follower 92 is normally spaced above and positioned in the vertical plane of the high cam surface 96. On the other hand, when push-button 86 is manually depressed by an operator to the extent permitted by movement of follower 92 along slot 93, follower 92 is then positioned in spaced relation to and above the low cam surface 97.

Since operating lever 70 is longer and heavier than handle 76, downward movement of the free end of lever 70 is limited by a rod or pin 100 which extends substantially radially from a medial portion of the shaft or shank 75 of handle 76 and overlies the ear 94. It should be noted that ear 94 is disposed on the same side of shaft 95 as that from which operating lever 70 extends.

Now, assuming that an operator wishes to effect a primary flushing operation in which a relatively small amount of water is to be discharged from tank 20, the operator simply moves the handle 76 downwardly in a counterclockwise direction in FIGURE 2 or a clockwise direction in FIGURE 10, without depressing the push button 86. It is apparent that downward movement of the operating handle 76 will then be limited by engagement of follower 92 with the high cam surface 96 (see FIGURE 5). Thus, the handle 76 is moved from a normally inoperative position to an intermediate or primary flushing position in the course of which the looped portion 66 of connecting rod 67 engages the substantially horizontal portion of lift guide 65 and raises rod 46, magnets 45, 62 and valve member 40 from the position of FIGURE 2 to the intermediate or primary flushing position of FIGURE 3. In other words, downward movement of handle 76 to the intermediate position raises the shaft or rod 46 sufficiently to move magnet 62 into engagement with magnet 57 so that the magnets 57, 62 may then support the valve member 40 in the primary flushing position shown in FIGURE 3 during the discharge of water through outlet 26.

As heretofore stated, the reason why the main discharge valve member 40 is raised to the intermediate position is so that a predetermined relatively small amount of water may be discharged from the tank 20 as compared to the total amount of water which may be discharged from the tank 20 as compared to the total amount of water which may be discharged therefrom. Accordingly, means are provided for releasing the magnet 62 from the magnet 57 when the surface of the water has lowered from the normal filled level L to a predetermined intermediate level such as that indicated at L–1 in FIGURES 2 and 3, and so that the valve member 40 will return to closed position by gravity. To this end, it will be observed in FIGURES 1, 2, 3, 4 and 7 that the magnet 62 fixed on rod 46 has a transverse bar or cross-arm 101 suitably secured thereto and from opposed ends of which a pair of primary flush weight members 102, 103 are suspended.

The weight members 102, 103 are preferably in the form of hollow bullet-shaped bodies which are completely closed except for suitable apertures or openings 104 adjacent the upper ends thereof. The bodies of the primary flush weight members 102, 103 may each be provided with upwardly projecting threaded stem 106 thereon for threading the same through corresponding end portions of the cross arm 102.

The desired weight of the primary flush weight members 102, 103 can be determined empirically by placing a suitable ballast material, such as small metal pellets or the like in the weight members 102, 103 by passing them through the corresponding openings 104. Further, the openings 104 should be spaced a sufficient distance from the closed upper ends of the corresponding weight members 102, 103 so that water may fill the space between the upper edges of the openings 104 and the ballast in the weight members and a dead air space will then remain above the openings 104 within the weight members 102, 103 when the weight members 102, 103 are fully submerged in the water.

The purpose of the latter dead air space in the upper ends of the primary flush weight members 102, 103 is to lend some buoyancy to the primary flush weight members 102, 103 to, in effect, reduce the effective weight thereof when they are fully submerged. Of course, the weight of the water in the weight members 102, 104 is nil when the weight members are completely submerged in the water in tank 20. It is important, however, that the magnetic field between permanent magnets 57, 62, when they are in engagement with each other, is sufficient to support the combined weight of magnet 62, arm 101, weight members 102, 103, shaft 46 and all other elements carried by shaft 46, including the main discharge valve member 40, when the primary flush weight members 102, 103 are submerged and until the level of the water has receded to a point adjacent to, but above, the lowermost ends or bottoms of the primary flush weight members 102, 103.

However, when the level of the water has receded to the latter level adjacent the lower ends of the weight members 102, 103, the water will then no longer be supporting part of the weight of the weight members 102, 103. Thus, in effect, the weight members 102, 103 apply additional weight to shaft 46 when the surface of the water recedes to a level adjacent the lower ends of the weight members 102, 103. Thus, the additional weight of these weight members combined with the weight of cross-arm 101, magnet 62 and all other elements carried by shaft 46 must then be sufficient to overcome the magnetic force tending to maintain the magnet 62 in engagement with magnet 57. Assuming therefore that the operator will have released the handle 76 and permitted the same to return to the inoperative position shown in solid lines in FIGURE 2, it is apparent that the weight of the valve member 40 and associated elements heretofore described will then cause the valve member 40 to return to the closed position shown in FIGURE 2 by gravity.

The magnetic force acting between the permanent magnets 45, 51, when the valve 40 is raised to the full flushing position of FIGURE 4, is substantially greater than the magnetic force which attracts the permanent magnets 57, 62 to each other when they are in engagement with each other as shown in FIGURE 3. Thus, when the pushbutton 86 (FIGURES 1, 2, 10 and 11) is depressed to move follower 92 into vertical alinement with cam surface 97 and operating handle 76 is then moved downwardly, operating handle 76 moves to a full flushing position, and causes the free end of lever 70 to move upwardly to the position of FIGURE 4, for example.

Now, as shaft 46 is moved to its uppermost position, as shown in FIGURE 4, magnet 62 is initially moved against magnet 57 and, thereafter, sleeve 55 moves upwardly with magnet 62 relative to upper fixed guide 56. Thus, the magnet 45 on valve member 40 is raised against the lower fixed magnet 51 and, upon the handle 76 being released by the operator and being permitted to return to the fully raised or inoperative position of FIGURE 2, the magnetic attraction between the magnets 45, 51 is sufficient to maintain main discharge valve member 40 in fully raised position.

It is apparent that the magnetic force acting between magnets 45, 51 should be substantially greater than the magnetic force which will act between magnets 57, 62 when the same are in engagement with each other, because the magnets 45, 51 must support the combined weight of the valve member 40, the rod and all elements attached thereto or carried thereby and including the weight of magnet 57 and sleeve 55.

Although the weight of weight members 102, 103 combined with the weight of other members attached thereto is sufficient to overcome the magnetic force which attracts magnets 57, 62 toward each other when they are positioned in engagement with each other and when the level of the water has receded to a point very nearly approaching the bottoms of the weight members 102, 103, the weight of weight members 102, 103 combined with the weight of other elements connected thereto is not sufficient to overcome the magnetic force attracting magnets 45, 51 to each other when they are in engagement with each other. Accordingly, when magnets 45, 51 are in contacting interengagement, the water will continue to recede and be discharged through outlet 26 after the level of the water has receded substantially below the weight members 102, 103.

Thus, other means are provided for applying additional weight to the vertical rod or shaft 46 when the water has reached a predetermined low level at which the contents of the tank have been substantially emptied therefrom. In this instance, such additional weight applying means is shown in the form of a hollow secondary flush weight member 110 which may be identical to the primary flush weight members 102, 103, but whose effective weight should be substantially greater than that of the primary weight members 102, 103. Accordingly, a detailed description of the secondary flush weight member 110 is deemed unnecessary. The opening in weight member 110 which corresponds to the openings 104 in weight members 102, 103 is indicated at 111 in FIGURES 2 and 7. The weight member 110 is conveniently suspended from the stem 31 of float 30, as at 112, and is preferably positioned relatively closely adjacent to the float 30 so that it is substantially completely submerged in the water when the tank is filled to the normal high level L.

The upper end of shaft or rod 46 has a laterally projecting arm 113 thereon which is spaced a substantial distance above the flange 60 of sleeve 55 and to the free end of which one end of a pliable element or link chain 114 is suitably connected. The other end of pliable element 114 is connected to the stem 31 of float 30 at a point closely adjacent float 30, as at 116. Chain 114 is loosely suspended between stem 31 and arm 113 when tank 20 is full of water, but is of such length as to become taut when tank 20 is nearly empty and float 30 occupies a position near the bottom of tank 20.

From the foregoing description of primary flush weight members 102, 103, it is apparent that the weight of secondary weight member 110, in air, and when substantially relieved of the support effected by the float 30 when the float is not fully supported by the water, should be sufficient to overcome the magnetic attraction between magnets 45, 51 when the weight of secondary flush weight member 110 is combined with that of the stem 31, the exposed portion of float 30, the shaft 46 and all parts then supported thereby. Thus, assuming that the length of pliable element 114 is such that it will be pulled taut when the level of the water has receded to a point closely adjacent to and above discharge outlet 26, substantially as indicated at L–2 in FIGURES 2 and 7.

Since the free end of stem 31 and the float 30 move in an arcuate path in the course of downward movement thereof, the level of the water will recede relative to the secondary flush weight member 110 even though the weight member 110 moves downwardly with stem 31. Thus, since a portion of the weight of secondary flush weight member 110 is then no longer supported by the water in tank 20, the combined weight of secondary flush weight member 110 and the corresponding end portion of stem 31 will be added to the weight already supported by rod 46 and will overcome the magnetic attraction between the metallic members or magnets 45, 51 to separate the same so that the discharge valve member 40 will return to the closed position shown in FIGURE 2.

It is apparent that the size of the magnets and the strength of the corresponding magnetic fields created thereby relative to the weights of the primary flush weight members 102, 103 and the secondary flush weight member 110 before and after the weight members are substantially exposed above the corresponding receding level of the water is quite critical, but since all the parts which must be supported by the suspension members 55, 57 and suspension members 50, 51 may vary considerably as to size, shape and density, no attempt will be made herein to set forth a specific example as to how the sizes of the magnets and the weight members may be calculated. In fact, it is believed that the sizes of the magnets and the flush weight members can best be determined empirically during the construction of the apparatus.

Second Embodiment of the Invention

Figure 12:
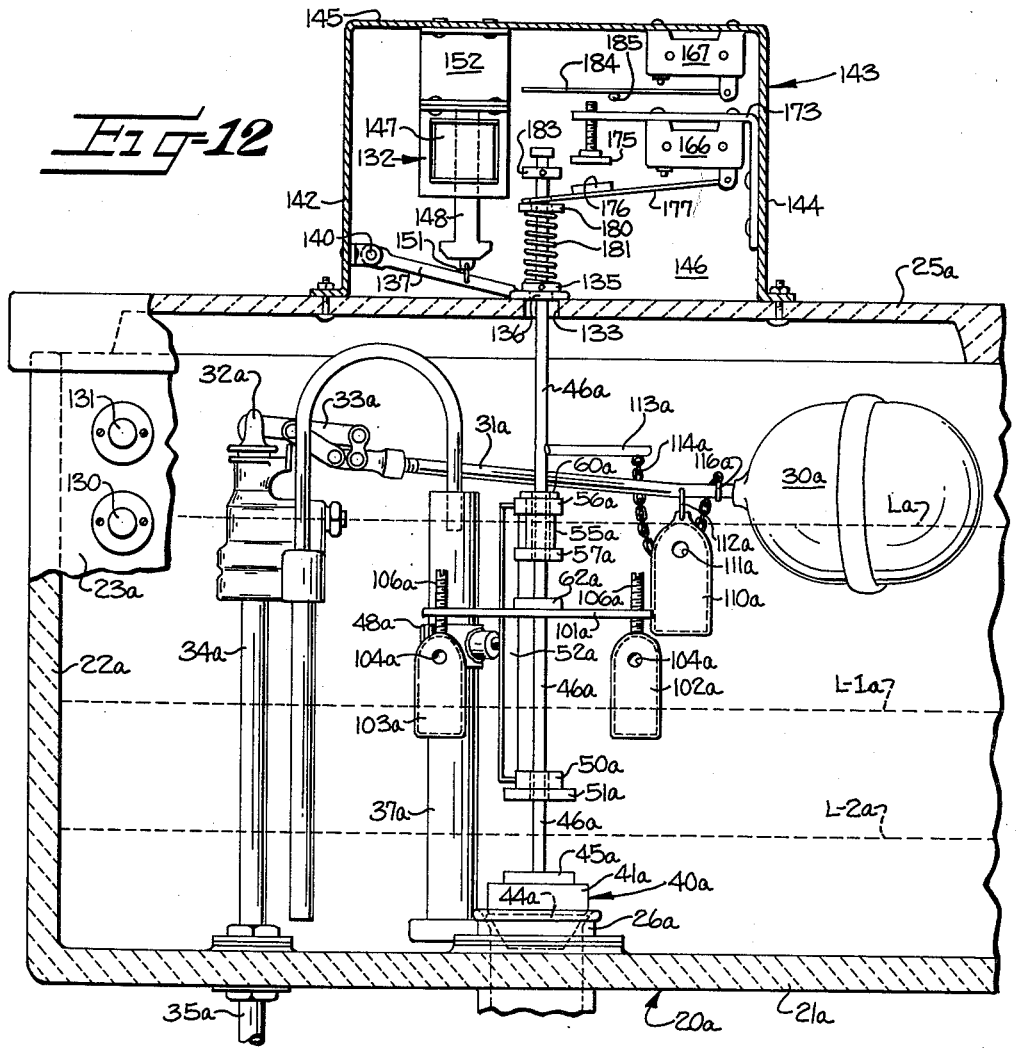
FIGURE 12 is a view similar to FIGURE 2, but showing a second form of the invention wherein the valve mechanism, although manually controlled, is operated through the medium of an electromagnetic device.
Figure 13:
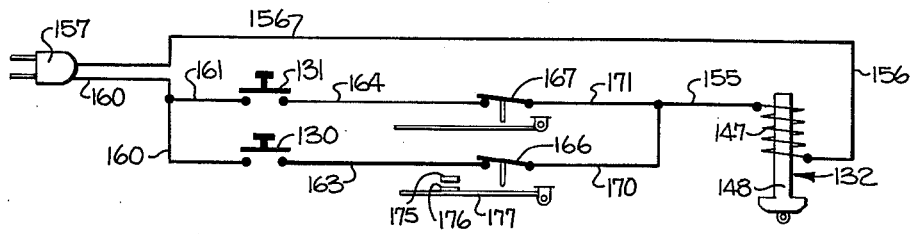
FIGURE 13 is a schematic diagram of an electrical circuit for the electromagnetic device shown in the upper central portion of FIGURE 12.

Referring to FIGURES 12 and 13, there is shown a second embodiment of means for manually controlling the amount of water to be discharged from a tank. With the exception of the specific electrical control mechanism of FIGURES 12 and 13, the apparatus shown in FIGURE 12 is substantially the same as that shown in FIGURES 1, 2, 3, 4, 7, 8, and 9 and, therefore, those parts shown in FIGURE 12 which correspond to like parts shown in FIGURES 1, 2, 3, 4, 7, 8 and 9 will bear the same reference characters with the small letter "a" added thereto, in order to avoid repetitive description.

As heretofore stated, the second form of the invention includes manually controlled, electrically operable means for selectively raising the main discharge valve member from closed position to intermediate or fully raised position at the will of the operator. To this end, instead of a control handle being provided on the front of the tank as shown in FIGURE 2, the front wall of tank 20a in FIGURE 12 has the housings of a pair of normally open push-button switches 130, 131 mounted thereon which are arranged in a parallel circuit to the coil 147 of a solenoid 132 whose plunger 148 is operatively connected to the upper end of the vertical rod 46a. It will be observed in FIGURE 12 that rod or shaft 46a extends upwardly beyond arm 113a and loosely passes through an opening 133 provided in the cover 25a of tank 20a. A portion of shaft 46a above cover 25a has a collar or abutment 135 fixed thereon which bears against the upper surface of a yoke 136 fixed to or formed integral with the free end of a lever 137. The yoke 136 may rest against the upper surface of cover 25a when main discharge valve member 40a occupies the closed position shown in FIGURE 12.

Lever 137 extends outwardly from yoke 136 and shaft 46a and is pivotally connected, as at 140, to one side wall 142 of a suitable enclosure 143 suitably secured to cover 25a of tank 20a. In addition to side wall 142, enclosure 143 includes an opposite side wall 144, a top wall 145 and a back wall 146.

Solenoid plunger 148 is vertically movable within coil 147 and the lower end thereof is pivotally connected to a medial portion of lever 137, as at 151. The coil 147 of solenoid 132 may be suitably suspended from the top wall 145, as by means of a bracket 152.

Referring to FIGURE 13, it will be observed that opposed ends of coil 147 of solenoid 132 have conductors or wires 155, 156 connected thereto. The end of conductor 156 remote from coil 147 is connected to one side of a source of electrical energy embodied in a plug 157. The other side of plug 157 has a conductor 160 leading therefrom to one side of the normally open push-button primary flushing switch 130. Conductor 160 is also connected to one side of normally open full flushing switch 131 by means of an intervening conductor 161. The sides of the switches 130, 131 opposite from respective conductors 160, 161 have respective conductors 163, 164 leading therefrom to corresponding sides of respective normally closed limit switches 166, 167. The sides of switches 166, 167 opposite from conductors 163, 164 are connected to the common conductor 165 by means of respective conductors 170, 171.

Referring to FIGURE 12, it will be observed that the housing of switch 167 is suitably secured to and depends from the upper wall 145 of enclosure 143. The housing of switch 166 is spaced below the housing of switch 167 and is suitably secured to an angle bracket 173 suitably secured to the wall 144 of enclosure 143. The horizontal portion of angle bracket 173 extends inwardly beyond housing of switch 166 and has a permanent magnet or metallic plate 175 adjustably depending therefrom. In this instance, metallic plate 175 is shown suitably secured to the head of a screw threaded through the horizontal arm of angle bracket 173.

The metallic plate 175 is normally spaced above a mating metallic plate 176 which may also be in the form of a permanent magnet. Metallic plate 176 is mounted on a switch actuating arm 177 extending from the housing of switch 166 and whose free end is loosely penetrated by an upper portion of the shaft 46a which is connected to the main discharge valve member 40a.

It is apparent that the metallic members 175, 176 may both be in the form of permanent magnets or either of them may be in the form of a permanent magnet, provided that the magnetic attraction between metallic plates 175, 176 is sufficient to maintain them in engagement with each other once they are moved into engagement with each other, as will be presently described. The free end of actuating arm 177 of switch 166 rests upon an abutment or plate 180 loosely mounted on the upper portion of shaft 46a and resting upon the upper end of a normally relaxed compression spring 181. Compression spring 181 is loosely mounted on shaft 46a and rests upon abutment 135.

The coil 147 of solenoid 132 should be designed so that the magnetic flux produced upon energization thereof is only sufficient to overcome the weight of the solenoid plunger 148 and the elements to be raised thereby so that the solenoid plunger 148 will move upwardly relatively slowly each time the coil 147 is energized. Thus, upon closing primary flushing switch 130, coil 147 is energized through switch 166 and causes solenoid plunger 148 to move upwardly to raise shaft 46a until main discharge valve member 40a is raised to the intermediate or primary flushing position with magnet 62a engaging magnet 57a. When valve member 40a reaches the latter position, switch arm 177 opens switch 166 and breaks the circuit to the coil 147 of solenoid 132, thus permitting plunger 148 and lever 137 to return to the lowered position. At the instant that switch 166 is opened by switch arm 177, magnet 176 engages magnet 175 and is retained in raised position thereby. A collar 183 fixed on shaft 46a is spaced above switch arm 177. The permanent magnets 175, 176, maintain open the switch 166, until water has receded to the exemplary intermediate level L–1a, to prevent unintentional operation of solenoid 132 by switch 130 until the primary flushing has been completed once it has been called for. When the level of the water in tank 20a recedes to intermediate level L–1a adjacent the lower portions of primary flush weight members 102a, 103a, and as the water is being discharged from the tank 20a through outlet 26a, the additional weight applied to the shaft 46a as the weight members 102a, 103a are relieved of the partial support of the water, overcomes the strength of the magnetic field between magnets 57a, 62a so that they are separated and the valve member 40a returns to closed position by gravity. This also lowers collar 183 to separate magnets 175, 176 and close switch 166.

When the secondary flush push-button switch 131 is manually closed, it will be noted that the electrical circuit to the coil 147 of solenoid 132 is completed through the normally closed upper switch 167 so that the electrical current by-passes the switches 130, 166. Thus, even though switch 166 is opened as plunger 148 and shaft 46a move upwardly with the closing of switch 131, the coil 147 of solenoid 132 remains energized so that shaft 46a continues to move upwardly as spring 181 is compressed by collar 135. Shaft 46a continues to move upwardly until the upper end of shaft 46a engages switch arm 184 pivotally mounted on the housing of switch 167, whereupon switch arm 184 engages the plunger of switch 167 and opens the same, thus breaking the circuit to the coil 147 of solenoid 132. It should be noted that switch arm 184 may be prevented from moving downwardly below the desired level by means of a pin 185 carried by the enclosure 143.

From the foregoing, it is apparent that the closing of switch 131 by an operator causes valve member 40a to move upwardly to fully raised position with magnets 45a, 51a in engagement with each other, whereupon water is discharged through the outlet 26a of tank 20a until the full weight of the primary flush and secondary flush weight members 102a, 103a, 110a is applied to shaft 46a in the same manner as that described with respect to the first form of the invention, and at which time the level of the water will have receded to a point closely adjacent the lower wall 21a of tank 20a and valve member 40a will return to closed position as the two switch arms 184, 177 will successively return to inactive position to permit closing of the respective switches 167, 166. Thus, following the closing of switch 131, the water will recede substantially to the level L–2a before valve member 40a starts to drop to closed position.

*Third Embodiment of the Invention*

Referring to FIGURES 14 and 15, there is shown a third embodiment of the invention in which the discharge valve member differs from that shown in the first and second embodiments of the invention and wherein the valve member is shown for use in a single or full flushing operation, although it is apparent that the valve member of FIGURES 14 and 15 may readily be used with the dual flushing arrangements of FIGURES 1 to 13, without departing from the spirit of the invention. The conventional structure shown in FIGURES 14 and 15 which corresponds to like structure shown in FIGURE 2, for example, shall bear the same reference characters with the small "b" added thereto in FIGURES 14 and 15, to avoid repetitive description.

It will be noted that the structure in FIGURE 14 includes, in addition to other conventional elements a conventional operating handle 76b fixed to the outer end of a shaft 75b which is journaled in the front wall 23b of tank 20b and to the inner end of which one end of the operating lever 70b is suitably secured. It is apparent that, if the valve member of FIGURES 14 and 15 is used with the dual flushing apparatus of FIGURE 2, for example, the handle 76b, shaft 75b and operating lever 70b may be arranged in the same manner as that shown in FIGURES 1, 2 10 and 11. However, since the valve member of FIGURES 14 and 15 is shown as being used only for a single, full flushing, operation, the handle 76b, shaft 75b and lever 70b may be suitably interconnected in a conventional manner. In FIGURES 14 and 15, the free end of operating lever 70b is shown equipped with a link or connecting rod 67b which may be connected to operating lever 70b in the same member in which connecting rod 67 is connected to operating lever 70 in FIGURE 2. The novel valve member and associated elements will now be described in detail.

The valve member of the third form of flushing mechanism shown in FIGURES 14 and 15 is broadly designated at 240 and comprises an open-topped or substantially cup-shaped body 241 which may have a capacity for containing approximately one pint of water, for example. The cup-shaped body 241 has a solid substantially frusto-conical or tapered lower portion 242 integral therewith or suitably secured thereto. The tapered lower portion 242 is provided with a peripheral groove 243 therein for receiving a resilient annular sealing element or O-ring 244 therein. The O-ring is preferably made from neoprene, but may be made from any other suitable resilient material.

Body 241 and its frusto-conical lower portion 242 may be made from molded plastic or any other suitable material. The tapered lower portion 242 of valve member 240 is adapted to fit loosely within the upper end of outlet pipe 26b with its O-ring 244 in engagement with the tapered valve seat 27b for normally closing the outlet of tank 20b.

The upper end of the tapered lower portion 242 of valve member 240 defines a bottom 245 in the cup-shaped body 241. A metallic plate or disc 246 is adhesively or otherwise suitably secured to the upper surface of the bottom 245 of body 241. The lower end of a substantially vertically disposed rod or shaft 247 is suitably secured to the bottom 245 of body 241, as by being threaded into the tapered lower portion 242.

A medial portion of rod 247 is guided for vertical movement in a sleeve or tubular guide member 250 whose lower end terminates in substantially spaced relationship above the bottom 245 of valve body 241 and has a metallic plate 251 suitably secured thereto. The metallic plates 246, 251 may both be in the form of permanent magnets although only one of them need necessarily be in the form of a permanent magnet, as desired. The rod 247 and the sleeve 250 are preferably made from copper or other suitable non-magnetic material. The upper portion of sleeve 250 is carried by a block 252 fixed to a bracket 253 clampingly or otherwise suitably secured to standard 37b. The tubular guide or sleeve 250 may be fixed in the block 252 or it may be mounted for vertical sliding movement therein, in which case the upper end of sleeve 250 may be provided with an annular flange 255 which may engage the upper surface of block 252 to limit downward movement of sleeve 250.

The upper end of rod 247 loosely extends through the eye or loop 66b on the lower end of connecting rod 67b and has an abutment or loop 256 on its upper end which is adapted to be engaged by the eye 66b when lever 70b is raised by an operator moving the operating handle 76b downwardly in FIGURE 14. In so doing, lever 70b moves to substantially the position shown in FIGURE 15 and thus raises therewith the shaft or rod 247 and other elements connected thereto. It will be observed in FIGURE 15 that, when rod 247 is moved to raised position, the valve member 240 is raised therewith to move magnet 246 into engagement with magnet 251. Thereupon, the operator may release handle 76b so the lever 70b will return to the lowered position.

However, valve member 240 will then remain in the raised position shown in FIGURE 15 due to the magnetic field between the permanent magnets 246, 251. It is apparent that the field strength of the permanent magnets 246, 251 is sufficient to support the valve member 240 in the raised, opened, position of FIGURE 15 as long as the valve member 240 is submerged in the water in tank 20b. However, the field strength of the permanent magnets 246, 251 is insufficient to support the valve member 240 when its cup-shaped body 241 is filled or substantially filled with water and the cup-shaped body 241 is not submerged in the water. Thus, it follows that, upon the level of the water in the tank receding, by discharge of water through outlet pipe 26b, to substantially the level indicated at L–2b in FIGURES 14 and 15, and at which time the water level is substantially below the upper portion of the body 241 of valve member 240, it is apparent that the weight of the valve member 240 with the water therein will overcome the magnetic attraction between the permanent magnets 246, 251. Thus, the valve member 240 will return to the closed position of FIGURE 14 at substantially the same time that the tank 20b becomes empty.

It is thus seen that I have provided three embodiments of a novel and improved valve mechanism for flush tanks in which the valve member may be raised from a closed to an open position while submerged and a permanent magnet or magnets retain the valve member in the raised position until the level of the water in the tank has receded to a predetermined level, whereupon additional weight is automatically applied to the valve member such as to overcome the magnetic attraction between the permanent magnets to thus permit the valve member to return to closed position.

It is seen further that I have provided two embodiments of novel, manually operable means for selectively raising the valve member for the outlet of the flush tank to either of two positions and wherein permanent magnetic means are provided for maintaining the valve member in either of the said two positions, and further, wherein the raising of the valve member to an intermediate position causes a predetermined partial amount of the water in the tank to be discharged therefrom and the valve member is then released from the magnetic means and, also, wherein the raising of the valve member to the uppermost or fully raised position permits substantially all the water to be discharged from the flush tank and the valve member is then released from the corresponding magnetic means and returns to closed position.

In the drawings and specification there have been set forth preferred embodiments of the invention and, although specific terms are employed, they are used in a generic and descriptive sense only and not for purposes of limitation, the scope of the invention being defined in the claims.

I claim:
1. A valve mechanism for use with a flush tank normally filled with water to a predetermined level and wherein the lower portion of said tank is provided with a valve seat defining a discharge outlet therein, said valve mechanism comprising
 (a) a valve member adapted to engage said seat and close said outlet against leakage of water therethrough and adapted to be lifted off said seat to open said outlet,
 (b) permanent magnet means for holding said valve member in spaced relation above said outlet when said valve member is lifted off said seat, and
 (c) means responsive to predetermined lowering of the level of the water in the tank for overcoming the strength of the magnetic field of said permanent magnet means and causing said valve member to drop into engagement with said seat to close said discharge outlet.

2. A structure according to claim 1, in which said permanent magnet means comprises
 (1) a first metallic plate movable in fixed relation to said valve member,
 (2) a second metallic plate spaced above said first plate when said valve member occupies closed position and adapted to be engaged by said first plate when said valve member is lifted off said seat, and
 (3) at least one of said plates being a permanent magnet attracting the other of said plates toward the same.

3. A valve mechanism for use with a flush tank normally filled with water to a predetermined level and wherein the lower portion of said tank is provided with a valve seat defining a discharge outlet therein; said valve mechanism comprising
 (a) a valve member adapted to engage said seat and close said outlet against leakage of water therethrough,,
 (b) at least one suspension member spaced above said valve member,
 (c) means for lifting said valve member off said seat to permit water to flow through said outlet,
 (d) said members being permanently magnetically attracted to each other with sufficient force to retain said valve member in a raised position upon said valve member being lifted a predetermined minimum distance, and
 (e) means responsive to predetermined lowering of the level of the water in the tank for applying a downward force to said valve member sufficient to overcome the strength of the magnetic field between said members and cause said valve member to drop into engagement with said seat and close said discharge outlet.

4. A valve mechanism for use with a flush tank normally filled with water to a predetermined level and, wherein the lower portion of the tank has a discharge outlet therein; said valve mechanism comprising
 (a) a valve member adapted to occupy a normally closed position at said outlet,
 (b) at least one suspension member having a first metallic plate on its lower portion,
 (c) a second metallic plate movable with said valve member and normally spaced below said first metallic plate when said valve member occupies closed position,
 (d) means for raising said valve member a predetermined distance off its seat while raising said second plate into contacting engagement with said first plate whereby water may flow through the outlet,
 (e) at least one of said plates being a permanent magnet having a field strength at least sufficient to support said valve member and any other weight then carried by said valve member when said plates are in engagement with each other, and
 (f) means responsive to lowering of the level of the water in the tank to a predetermined distance below said predetermined level for releasing the second plate from the first plate and permitting the valve member to return to closed position.

5. A structure according to claim 4, in which said responsive means (f) comprises a substantially cup-shaped body on said valve member and normally being submerged in the water in said tank whereby the water in said body effects an increase in the weight of said valve member upon the level of the water in the tank dropping below the level of the water in said body.

6. A structure according to claim 4, in which said responsive means (f) includes a weight means operatively connected to said valve member and having an effective weight while substantially submerged in water insufficient to overcome the strength of said magnetic field, but said weight means, while not submerged in water, having an effective weight exerting a downward force on said valve member sufficient to overcome said magnetic field.

7. A valve mechanism for use with a flush tank normally filled with water to a predetermined high level and wherein the lower portion of said tank is provided with a valve seat defining a discharge outlet therein, said valve mechanism comprising (a) a valve member adapted to engage said seat and close said outlet against leakage of water therethrough and adapted to be lifted off said seat to either of two levels to open said outlet, (b) independent permanent magnet means for holding said valve member in each of said levels above said outlet depending upon the level to which said valve member is lifted off said seat, (c) means responsive to predetermined lowering of the water in the tank to an intermediate level following the lifting of said valve member to one of said two levels for overcoming the strength of the magnetic field of the corresponding permanent magnet means and causing said valve member to drop into engagement with said seat to close said discharge outlet, and (d) means responsive to the lowering of the water in the tank to a level adjacent its lower portion following the lifting of said valve member to the other of said two levels for overcoming the strength of the magnetic field of the corresponding permanent magnet means and causing said valve member to drop into engagement with said seat.

8. A valve mechanism for use with a flush tank normally filled with water to a predetermined normal level and wherein the lower portion of said tank is provided with a valve seat defining a discharge outlet therein, said valve mechanism comprising (a) a valve member adapted to engage said seat and close said outlet against leakage of water therethrough, (b) manually controlled means for selectively raising said valve member to a first level to open said outlet and to a second, higher, level to also open said outlet, (c) first and second permanent magnet means for holding said valve member at the respective first and second levels to which said valve member is raised, (d) means responsive to lowering of the water in the tank to an intermediate level following the raising of said valve member to said first level for overcoming the strength of the magnetic field of the first permanent magnet means and causing said valve member to drop into engagement with said seat to close said discharge outlet, and (e) means responsive to lowering of the water in the tank to a level adjacent the lower portion of the tank following the raising of said valve member to said second level for overcoming the strength of the magnetic field of the second permanent magnet means and causing said valve member to drop into engagement with said seat to close said outlet.

9. A structure according to claim 8, in which said manually controlled means (b) comprises (1) a manually movable control handle, (2) a shaft journaled in said tank and to which said handle is fixedly connected, (3) a substantially upright rod connected at its lower end to said valve member and guided for substantially vertical movement in said tank, (4) means operatively connecting said shaft to an upper portion of said rod such that turning said handle and shaft in one direction raises said rod and said valve member, (5) means normally limiting turning movement of said handle and shaft to cause said valve member to be raised to said first level, and (6) manually operable means for changing said limiting means to permit additional turning movement of said handle and shaft to cause said valve member to be raised to said second level.

10. A structure according to claim 8, in which said manually controlled means (b) comprises (1) a substantially upright rod connected at its lower end to said valve member and guided for substantially vertical movement in said tank, (2) electrically operable means operatively connected to said rod for raising the same, (3) first and second normally open independently manually operable switches interposed in an electrical circuit to said electrically operable means for energizing the same when said switches are closed, (4) first means operable automatically to break the circuit to said electrically operable means upon said valve member being raised to said first level following the closing of said first switch, and (5) second means operable automatically to break the circuit to said electrically operable means only upon said valve member being raised to said second level following the closing of said second switch.

11. A structure according to claim 10, in which said electrically operable means (2) comprises (a') a solenoid coil fixed adjacent the upper portion of said rod, (b') a solenoid plunger in said coil, and (c') means connecting the plunger to said rod.

12. A structure according to claim 11, in which said first and second switches are arranged in parallel in said circuit and said first and second automatically operable means comprise respective third and fourth normally closed switches in series with the respective first and second switches, and means on said rod for opening the third switch as said rod is raised by the closing of said first switch and for opening the fourth switch as said rod is raised by the closing of said second switch.

13. A structure according to claim 8, in which said second permanent magnet means has a greater field strength than said first permanent magnet means and in which said first permanent magnet means comprises (1) a first metallic plate suspended for vertical movement in spaced relation above said valve member, (2) a guide rod fixed to said valve member and extending upwardly and loosely through said first plate, (3) a second metallic plate fixed on said rod and normally spaced a predetermined distance below said first plate when said valve member is closed and arranged to contact said first plate when said valve member is raised to said first level, (4) at least one of said plates being a permanent magnet, said second permanent magnet means comprising (5) a third stationary metallic plate spaced between said second plate and said valve member and loosely penetrated by said rod, (6) a fourth metallic plate on an upper portion of said valve member arranged to contact said third plate when said valve member is raised to said second level and in the course of which said first and second plates are raised with said valve member, and (7) at least one of the third and fourth plates being a permanent magnet.

14. A structure according to claim 13, in which said responsive means (d) comprises at least one first weight member carried by said rod and located a predetermined distance below the normal level of the water in said tank, the weight of said weight member when submerged in water being less than the field strength of said first permanent magnet means when said first and second plates are in contacting engagement but said weight member being heavier than the latter field strength will support upon the water receding to a level substantially exposing said weight member thereabove.

15. A structure according to claim 14, in which said flush tank includes a float and a stem connected to the float for controlling the flow of water into the tank, said responsive means (e) comprising (1) a second weight member suspended from said stem and normally substantially submerged in the water in said tank, (2) a pliable element normally freely suspended between and interconnecting an upper portion of said rod and said stem and being of such length as to be drawn taut as the float approaches its lowermost position during the discharge of water from said tank, and (3) the weight of said second weight member, when added to that of the rod, the valve member, the first plate, the fourth plate and the first weight member, being sufficient to overcome the magnetic attraction between said third and fourth plates following the raising of said valve member to said second level and the tightening of said pliable element to thereby close said valve member.

16. A structure according to claim 14, in which said responsive means (e) comprises a normally submerged cup-like portion on said valve member for containing sufficient water therein such as to overcome the strength of the magnetic field of said second magnetic means when at least a substantial portion of said cup-like portion becomes exposed above the level of the water in the tank as it is escaping through said outlet.

17. A valve mechanism for a flush tank normally filled with water to a predetermined level and wherein said tank is provided with an outlet-valve seat in its lower portion; said device comprising
 (a) a valve above and normally closing said seat,
 (b) a rod connected to and extending upwardly from said valve,
 (c) means for selectively raising said rod and said valve to a first level and to a second level higher than said first level,
 (d) a first pair of vertically spaced upper and lower metallic members loosely penetrated by said rod,
 (e) a second pair of upper and lower metallic members fixed to said rod, straddling the lower of the first members and being spaced beneath the respective upper and lower members of the first pair with the two lower members being spaced further apart than the two upper members when said valve is closing said seat,
 (f) means fixedly supporting said lower member of the first pair,
 (g) means suspending said upper member of the first pair and permitting upward movement thereof relative to said suspending means,
 (h) weight means fixed to said upper member of the second pair,
 (i) means applying a greater weight to said valve than that of said weight means upon said valve being substantially exposed to air,
 (j) at least one of the metallic members of each one of the pairs being in the form of a permanent magnet with the magnetic attracting force between the upper metallic members being substantially less than the magnetic attracting force between the lower metallic members,
 (k) the magnetic attracting force between the upper members being substantially greater than the weight of said weight means when the latter is submerged but less than the weight of said weight means in air,
 (l) the magnetic attracting force of the lower members being greater than the submerged weight of said valve,
 (m) the raising of said rod to said first level being such as to open said valve and to cause said upper metallic members to become interengaged whereby the upper members are magnetically interconnected and remain so until sufficient water flows through said outlet-valve seat such that said weight means becomes heavier than the magnetic attracting force between said upper members, and
 (n) the raising of said rod to said second level serving to move the two lower members into interengagement while raising both upper members therewith upon interengagement thereof whereby the lower members remain interconnected until a substantially greater amount of water has left the tank through said outlet-valve seat such that the weight of the valve with said applying means exceeds the magnetic attracting force between said lower members.

18. A valve member for use with a flush tank having a valve seat defining a discharge outlet in the lower portion of said tank; said valve member comprising
 (a) a substantially circular body having a lower portion adapted to fit against said valve seat and close said outlet, and
 (b) a permanent magnet fixed on the upper portion of said valve member.

19. A structure according to claim 18, in which said lower portion of said valve member is of substantially frustoconical shape, and an annular sealing ring of resilient material attached to and encircling said lower portion.

20. A structure according to claim 18, in which the upper portion of said valve member is substantially cup-shaped, and said permanent magnet being positioned within the cup-shaped upper portion adjacent the bottom thereof.

References Cited in the file of this patent

UNITED STATES PATENTS

| | | |
|---|---|---|
| 2,056,087 | Andrews | Sept. 29, 1936 |
| 2,495,213 | Drums | Jan. 24, 1950 |